(12) United States Patent
Adams, Jr. et al.

(10) Patent No.: US 9,910,886 B2
(45) Date of Patent: Mar. 6, 2018

(54) VISUAL REPRESENTATION OF QUESTION QUALITY

(71) Applicant: International Business Machines Corporation, Armonk, NY (US)

(72) Inventors: Richard H. Adams, Jr., Boulder, CO (US); Swaminathan Chandrasekaran, Coppell, TX (US); Sridhar Sudarsan, Round Rock, TX (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/689,106

(22) Filed: Apr. 17, 2015

(65) Prior Publication Data

US 2016/0306846 A1 Oct. 20, 2016

(51) Int. Cl.
*G06F 7/00* (2006.01)
*G06F 17/30* (2006.01)
*G06N 5/02* (2006.01)

(52) U.S. Cl.
CPC .. *G06F 17/30401* (2013.01); *G06F 17/30392* (2013.01); *G06N 5/02* (2013.01)

(58) Field of Classification Search
CPC ........... G06F 17/30654; G06F 17/3053; G06F 17/30696
See application file for complete search history.

(56) References Cited

U.S. PATENT DOCUMENTS

| | | | | |
|---|---|---|---|---|
| 8,538,744 B2* | 9/2013 | Roberts | ............. | G06F 17/30654 379/265.01 |
| 2004/0049499 A1* | 3/2004 | Nomoto | ............ | G06F 17/30654 |
| 2013/0204739 A1 | 8/2013 | Friedman | | |
| 2013/0262501 A1* | 10/2013 | Kuchmann-Beauger | | G06F 17/30958 707/769 |
| 2014/0149446 A1* | 5/2014 | Kuchmann-Beauger | | G06F 17/30389 707/763 |

(Continued)

OTHER PUBLICATIONS

Anonymous, "A Method and System for Assisting Users to Interact with Interactive Elements", An IP.com Prior Art Database Technical Disclosure, Jun. 10, 2013. IP.com No. 000228153. http://ip.com/IPCOM/000228153.

(Continued)

*Primary Examiner* — Tuan A Pham
(74) *Attorney, Agent, or Firm* — Jay Wahlquist

(57) ABSTRACT

Aspects of the present disclosure, in certain embodiments, are directed toward providing a visual representation of question quality in a question answering system. More particularly, aspects are directed toward receiving, by a question answering system, an input question having a set of query attributes. The set of query attributes may be user-influenced characteristics of the input question. Aspects of the present disclosure are also directed toward evaluating, by comparing the set of query attributes to a set of assessment criteria, the quality of the input question. Aspects of the present disclosure are also directed toward assigning, in response to evaluating the quality of the input question, a set of quality values to the set of query attributes. Using the assigned set of quality values and the set of query attributes, an icon that indicates a visual representation of the quality of the input question may be generated.

16 Claims, 7 Drawing Sheets

(56) References Cited

U.S. PATENT DOCUMENTS

2014/0172481 A1    6/2014   Godwin
2014/0280087 A1*  9/2014   Isensee ............ G06F 17/30477
                                                                      707/723

OTHER PUBLICATIONS

IBM, "Base and element icons", An IP.com Prior Art Database Technical Disclosure, Jun. 1, 2009. IP.com No. 000183757. http://null/IPCOM/000183757.

* cited by examiner

VISUAL REPRESENTATION OF QUESTION QUALITY

BACKGROUND

This disclosure relates generally to computer systems and more particularly relates to providing a visual representation of question quality.

The amount of data and information available on the internet and other communication networks is growing rapidly. Question answering systems are one tool by which a user may find desired information. As the amount of available information increases, the need for question answering systems may also increase.

SUMMARY

Aspects of the present disclosure, in certain embodiments, are directed toward providing a visual representation of question quality in a question answering system. More particularly, aspects are directed toward receiving, by a question answering system, an input question having a set of query attributes. The set of query attributes may be user-influenced characteristics of the input question. Aspects of the present disclosure are also directed toward evaluating, by comparing the set of query attributes to a set of assessment criteria, the quality of the input question. Evaluating the input question may include using a natural language processing technique to parse semantic and syntactic content of the input question. Based on the semantic and syntactic content, the set of query attributes of the input question may be identified. Aspects of the present disclosure are directed toward determining whether the set of query attributes achieves a satisfaction threshold with respect to the set of assessment criteria. Aspects of the present disclosure are also directed toward assigning, in response to evaluating the quality of the input question, a set of quality values to the set of query attributes. Using the assigned set of quality values and the set of query attributes, an icon that indicates a visual representation of the quality of the input question may be generated.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
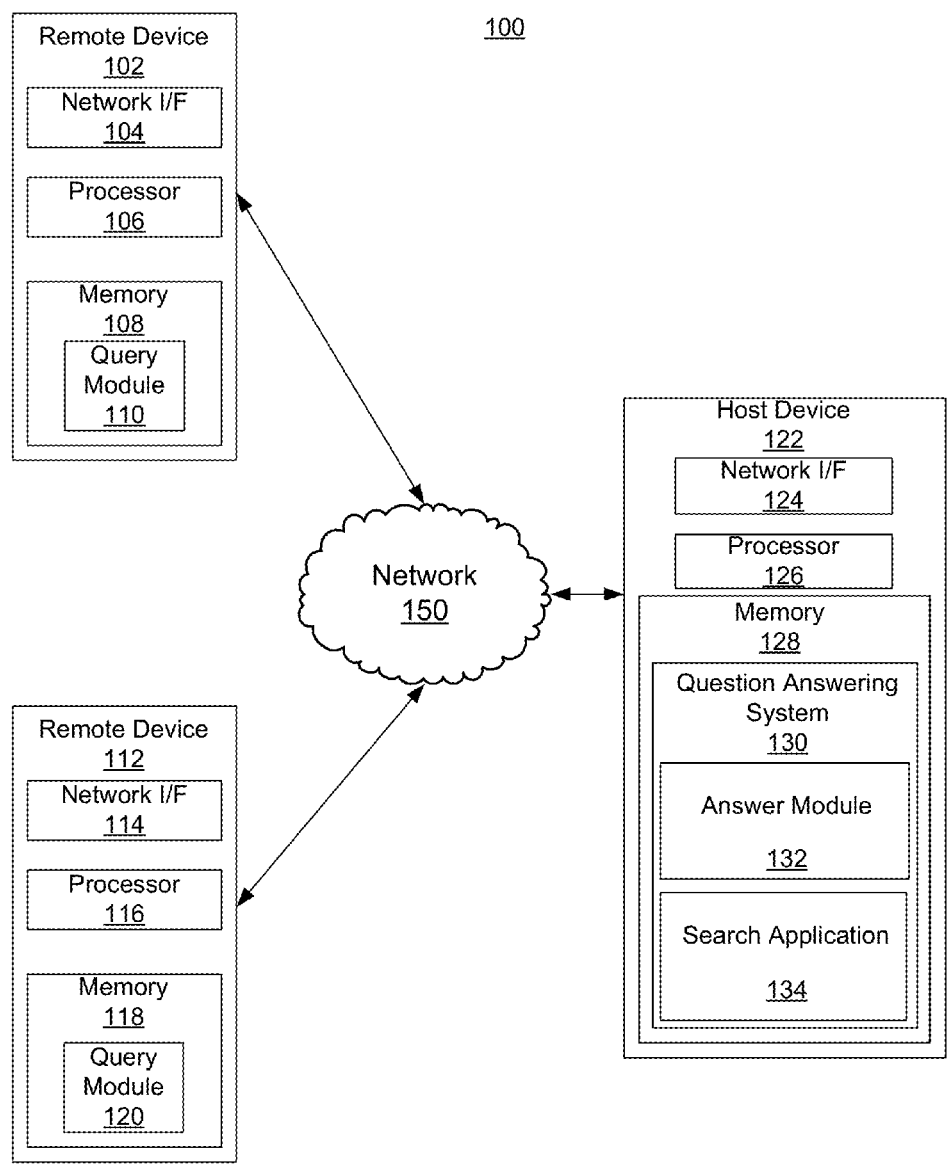
FIG. 1 is a diagrammatic illustration of an example computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and methodology for a computer-implemented question answering system. More particular aspects relate to generating a visual representation of the quality of a question submitted to a question answering system. The method may include receiving, by a question answering system, an input question having a set of query attributes. The set of query attributes may be user influenced characteristics of the input question. The method may include evaluating the quality of the input question by comparing the set of query attributes to a set of assessment criteria. In response to evaluating the quality of the input question, the method may include assigning a set of quality values to the set of query attributes. Using the assigned set of quality values and the set of query attributes, the method may include generating an icon that indicates a visual representation of the quality of the input question.

As the amount of information available over computer networks, such as the Internet, rapidly increases, question answering systems have become a tool in assisting users with the gathering, searching, and analysis of data. However, aspects of the present disclosure relate to the recognition that, in certain situations, a question submitted to the question answering system by a user may have semantic or syntactic deficiencies that restrict the ability of the question answering system to provide satisfactory search results to the user. Accordingly, aspects of the present disclosure, in certain embodiments, are directed toward providing a visual representation of the quality of a question received by a question answering system. Particularly, aspects of the present disclosure are directed toward evaluating syntactic and semantic characteristics (e.g., query attributes) of the input question and generating an icon that communicates the quality of the question to the user who submitted the question. The present disclosure may provide benefits associated with increased search efficiency, and more complete, relevant search results.

Aspects of the present disclosure relate to a system and method for generating a visual representation of the quality of an input question to a question answering system. More particular aspects relate to generating the visual representation of the quality of the input question based on an evaluation of a set of query attributes of the input question. The method and system may work on a number of devices and operating systems. The method and system may include receiving, by a question answering system, an input question having a set of query attributes, wherein the set of query attributes are user-influenced characteristics of the input question. The set of query attributes may include syntax, part-of-speech usage, query length, and query complexity. The set of query attributes may also include abbreviation usage, ambiguous terminology, missing elements, and question focus.

Aspects of the present disclosure are directed toward evaluating the quality of the input question by comparing the set of query attributes to a set of assessment criteria. More specifically, evaluating the quality of the input question may include using a natural language processing technique configured to analyze syntactic and semantic content of the input question. Based on the semantic and syntactic content, the method may include identifying the set of query attributes of the input question. The method may then include determining whether the set of query attributes achieves a satisfaction threshold with respect to the set of assessment criteria.

Aspects of the present disclosure are directed toward assigning, in response to evaluating the quality of the input question, a set of quality values to the set of query attributes. The quality values may be a quantitative indication of the relative grade, caliber, relevance, or degree of completeness of the set of query attributes. In certain embodiments, aspects of present disclosure are directed toward assigning a set of weighting values to a subset of the set of query attributes. The set of weighting values may be a quantitative representation of the relative importance of a particular query attribute of the set of query attributes with respect to the input question. In certain embodiments, the method may further include analyzing the input question using a linguistic profiling technique, and collecting user context data from the input question. The user context data may include data regarding the age, level of education, native language, sentiment, and input device of the user. Based on the user context data, the method may include modifying the set of weighting values assigned to the set of query attributes.

Aspects of the present disclosure are directed toward generating, using the assigned set of quality values and the set of query attributes, an icon that indicates a visual representation of the quality of the input question. In certain embodiments, generating the icon may include mapping a first query attribute of the set of query attributes to a facial element of a digital face icon. Based on the first quality value assigned to the first query attribute, the method may include selecting a set of visual characteristics for the facial element. The set of visual characteristics for the facial element may include color, shape, size, location, and animation style. Further, in certain embodiments, aspects of the present disclosure may include assembling, based on the set of quality values, the set of weighting values, and the set of query attributes, a digital face icon that indicates a visual representation of the quality of the input question.

Aspects of the present disclosure, in certain embodiments, are directed toward collecting, using a graphical user interface, user feedback data regarding the digital face icon. Using a machine learning technique configured to process the user feedback data, the method may include defining a decision parameter for generating the digital face icon. Based on the feedback data and the decision parameter, the method may include adjusting the set of visual characteristics of the digital face icon.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 110 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., receiving an input question, evaluating the quality of the input question, assigning a set of quality values, and generating an icon, etc.), and may be implemented by any combination of any quantity of software and/or hardware modules or units.

Figure 2:
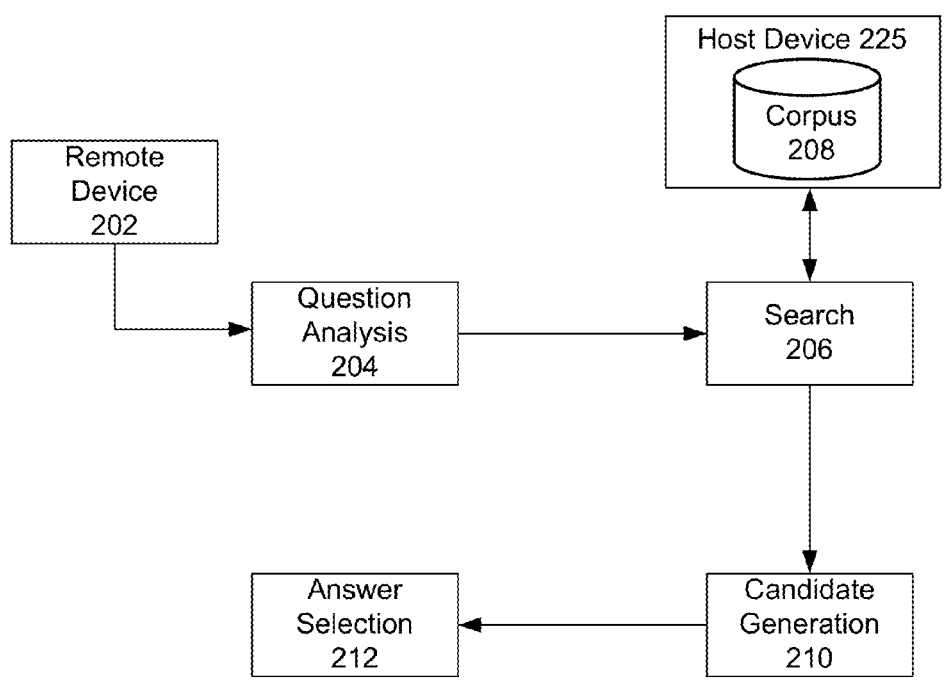
FIG. 2 is a system diagram depicting a high level logical architecture for a question answering system, consistent with embodiments of the present disclosure.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question for which relevant images can be provided. Further, the search component 206 can, in certain embodiments, be used to perform a search of a corpus of information 208 for a set of images that are related to an answer to an input question to the QA system. The candidate generation component 210 can be used to identify a set of candidate images based on the results of the search component 206. Further, the answer selection component 212 can, in certain embodiments, be used to determine and select a subset of the set of candidate images to provide in a display area. In certain embodiments, the determination of the subset of the candidate images can be based on a confidence value of the set of images and a designated display specification.

Figure 3:
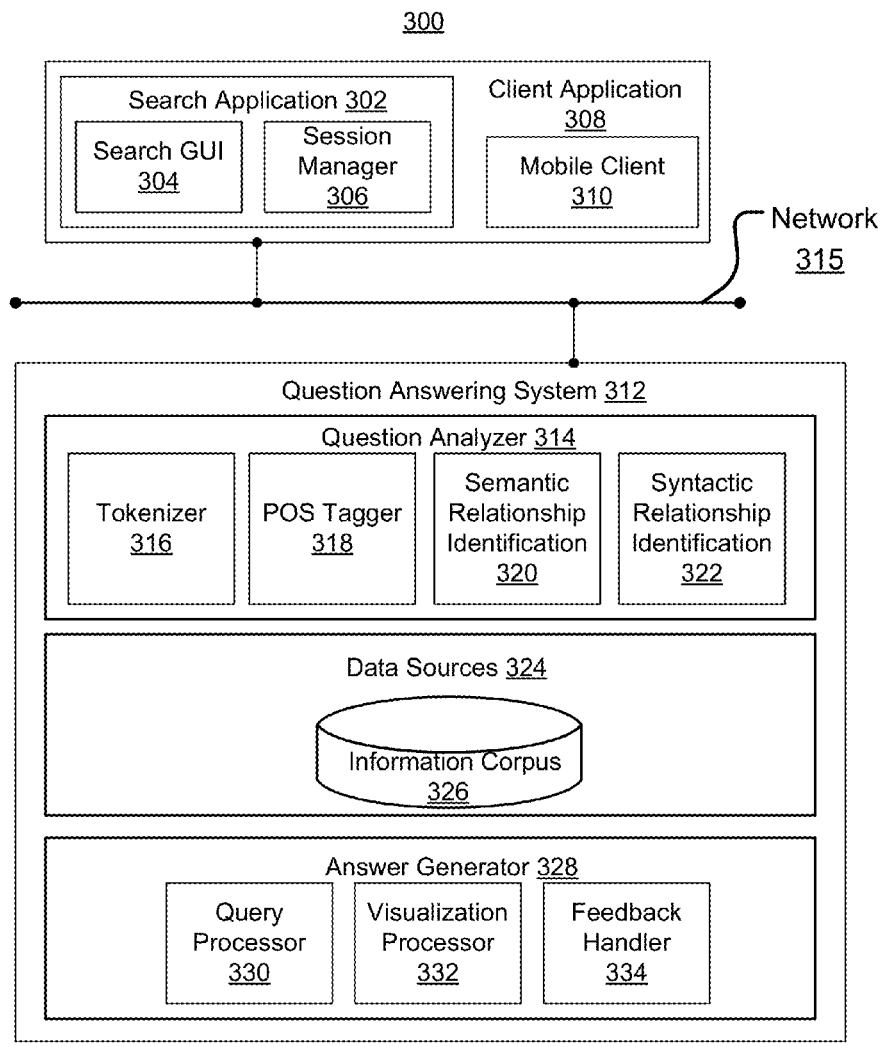
FIG. 3 is a block diagram illustrating a question answering system to generate answers to one or more input questions, consistent with various embodiments of the present disclosure.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database (e.g., conform to an ontology). In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive an input question having a set of query attributes. The question analyzer 314 could, in certain embodiments, be used to evaluate the quality of the input question by comparing the set of query attributes to a set of assessment criteria. Further, the question answering system 312 could, in certain embodiments, be used to perform a search of an information corpus 326 for data that may provide an answer to the input question. The answer generator 328 can be used assign a set of quality values to the set of query attributes, as well as use the assigned set of quality values and the set of query attributes to generate an icon that indicates a visual representation of the quality of the input question. Further, the visualization processor 332 can, in certain embodiments, be used to render the icon (e.g., a digital face icon) in a designated display area.

Figure 4:
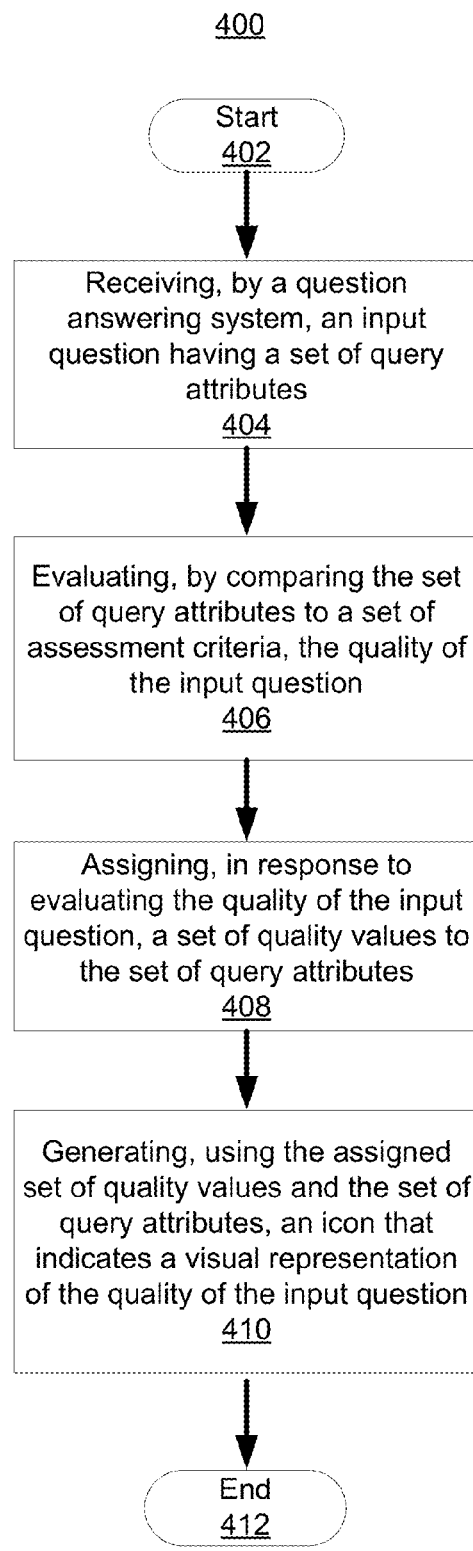
FIG. 4 is a flowchart illustrating a method for generating a visual representation of question quality in a question answering system, consistent with embodiments of the present disclosure.

FIG. 4 is a flowchart illustrating a method 400 for generating a visual representation of question quality in a question answering system, consistent with embodiments of the present disclosure. The method 400 may begin at block 402. Consistent with various embodiments, the method can include a receiving block 404, an evaluating block 406, an assigning block 408, and a generating block 410. The method 400 may end at block 412.

Consistent with various embodiments, at block 404 the method 400 can include receiving, by a question answering system, an input question having a set of query attributes. The input question may be one or more words that form a search term or request for data, information or knowledge. The input question may be a sentence or phrase expressed in natural language. In certain embodiments, the input question may be received by the question answering system via a remote device. For example, in certain embodiments, the question may be received from a cellphone, smart phone, tablet, personal computer, or other electronic device. For instance, the question answering system may receive an input question of "Who was the 13$^{th}$ President of the United States?" Other input questions are also possible.

As described herein, the input question may include a set of query attributes. Generally, the set of query attributes may be user-influenced characteristics, features, and other properties that compose the syntactic and semantic content of the input question. As examples, the set of query attributes may include query syntax, part-of-speech usage, query length, and query complexity. Additionally, in certain embodiments, the set of query attributes may include abbreviation usage, ambiguous terminology usage, missing elements, and question focus. Some input questions may include one or more of the query attributes described herein. Query attributes beyond those referenced explicitly herein are also possible.

Consistent with various embodiments, at block 406 the method 400 can include evaluating, by comparing the set of query attributes to a set of assessment criteria, the quality of the question. The set of assessment criteria may be a collection of standards and benchmarks that form a basis for judgment and evaluation of the input question. In certain embodiments, there may be one or more assessment criteria that correspond to each of the query attributes of the set of query attributes. For instance, in certain embodiments, for the query attribute of query length, an assessment criterion of "20 words or less" may be applied to the input question (e.g., input questions exceeding 20 words may not be sufficiently clear or succinct.) Additionally, in certain embodiments, an assessment criterion of "2 words or more" may correspond to the query attribute of query length (e.g., input questions less than 2 words may not sufficiently elucidate the desired information). As described herein, a number of assessment criteria may be compared to each query attribute of the set of query attributes.

In certain embodiments, evaluating the set of query attributes may include parsing the input question. In certain embodiments, parsing the input question may include using a natural language processing technique configured to analyze semantic and syntactic content of the input question. The natural language processing technique may be configured to parse both structured (e.g., tables, graphs) and unstructured data (e.g., textual content containing words, numbers, dates). In certain embodiments, the natural language processing technique may be a software tool, widget, or other program configured to analyze and identify the semantic and syntactic elements and relationships present in the input question. More particularly, the natural language processing technique can be configured to parse the grammatical constituents, parts of speech, context, and other relationships (e.g., modifiers) of the input question. The natural language processing technique can be configured to recognize keywords, context information, and metadata tags associated with words, phrases, or sentences in the input question. The syntactic and semantic elements analyzed by the natural language processing technique can include information such as word frequency, word meanings, text font, italics, hyperlinks, proper names, noun phrases, parts-of-speech, or the context of surrounding words. Other syntactic and semantic elements are also possible.

In certain embodiments, the method 400 may include identifying the set of query attributes of the input question based on the semantic and syntactic content parsed by the natural language processing technique. Identifying the set of query attributes may include using the semantic and syntactic content of the input question to determine and quantify the elements that correspond to the assessment criteria. As an example, consider an input question of "What is the proper way to set a formal dinner table for Xmas in Europe?" The method 400 may parse the input question and determine query attributes including a query length of 15 words, query syntax corresponding to a grammatically complete sentence, abbreviation usage (e.g., "Xmas"), a list of part-of-speech usages for each word of the sentence (e.g., the word "formal" is being used as an adjective, the word "set" is used as a verb), singular question focus (e.g., multiple question subjects are not present), moderate query complexity (e.g., the presence of three specified conditions, "formal," "for Xmas" and "in Europe" elevate the complexity of the query), as well as other query attributes of the input question. Other query attributes other than those specifically referenced herein may also be identified.

In certain embodiments, the method 400 may include determining whether the set of query attributes achieves a satisfaction threshold with respect to the set of assessment criteria. The satisfaction threshold may be a minimum acceptable criterion or standard that can be used to quantitatively gauge the quality or completeness of each query attribute. Put differently, the satisfaction threshold may be a representation of whether or not (or to what degree) a particular query attribute satisfies one or more corresponding assessment criteria. In certain embodiments, the satisfaction threshold may be a letter (e.g., A, B, C), symbol (e.g., +, −), numerical value (e.g., 56), or other representation that can be used to indicate the quality, completeness, or relevance of a particular query attribute. In certain embodiments, the satisfaction threshold may be expressed in a binary "pass/fail" format. In certain embodiments, there may be a set of satisfaction thresholds, wherein each query attribute corresponds to an individual satisfaction threshold. In certain embodiments, there may be a single aggregate satisfaction threshold that serves as a basis for evaluation of the cumulative set of query attributes.

Once again consider the example referenced above for the input question of "What is the proper way to set a formal dinner table for Xmas in Europe?" For the identified query attribute of abbreviation usage, the method 400 may compare the identified abbreviation of "Xmas" with an assessment criterion including a list of well-known and accepted abbreviations. In response to determining that the abbreviation of "Xmas" is present on the list, the query attribute of abbreviation usage may be determined to have achieved the satisfaction threshold. As an additional example, for the identified query attribute of query length, as the input question is 15 words long and achieves both the "20 words or less" and "2 words or more" assessment criteria, the query attribute of question length may be determined to have achieved the satisfaction threshold.

In certain embodiments, at block 408 the method 400 may include assigning a set of quality values to the set of query attributes. In certain embodiments, assigning the set of quality values to the set of query attributes may be performed in response to evaluating the quality of the input question. For instance, as described herein, in certain embodiments, the quality values may be assigned in response to determining whether or not the set of query attributes of an input question achieve one or more satisfaction thresholds with respect to the set of assessment criteria. Generally, the quality values may be numerical scores or values that quantitatively indicate the quality, completeness, clarity, or relevance of the input question. For example, in certain embodiments, the quality values may be represented as integer values between 0 and 100, wherein greater values indicate a substantially higher level of relative quality, and lesser numbers indicate a substantially lower level of relative quality. In certain embodiments, an individual quality value may be assigned to each query attribute of the set of query attributes. In such a situation, the method 400 may include calculating an aggregate query value to indicate the quality of the set of query attributes as a whole (e.g., the aggregate query value may an average of the individual query values). Other methods of assigning the set of query values are also possible.

As described herein, in certain embodiments, the set of quality values may be based on the comparison of the set of query attributes with the set of assessment criteria. More particularly, the set of quality values may be calculated based on the degree to which the set of query attributes achieves corresponding satisfaction thresholds (e.g., for each query attribute that meets its corresponding satisfaction threshold based on the assessment criteria, the quality value assigned to the input question increases). For instance, consider the following example, wherein an input question of "tmp in Africa and Washington" is received by the question answering system. The method 400 may include parsing the input question and determining query attributes including a query length of 5 words, query syntax corresponding to a sentence fragment, ambiguous terminology (e.g., the element "tmp" may be an uncommon abbreviation for the word "temperature," an acronym, a misspelled word, or other unrecognized word), and unclear question focus (e.g., the focus of the question may be difficult to determine due to the unspecified relationship between the elements "tmp," "Africa," and "Washington.)

As described herein, in certain embodiments, in response to identifying the query attributes for the input question, the method 400 may include determining whether each query attribute achieves a corresponding satisfaction threshold. As examples, referring again to the example above for the input question of "tmp in Africa and Washington," the query attribute of query syntax may fail to achieve a satisfaction threshold that requires a grammatically complete sentence (e.g., the input question is a sentence fragment), the query attribute of query length may achieve a satisfaction threshold that requires a length of 2 or more words (e.g., the input question is greater than 2 words), the query attribute of ambiguous terminology may fail to achieve a satisfaction threshold that requires clear terminology usage (e.g., "tmp" is not a known term), and the query attribute of question focus may fail a satisfaction threshold that requires a singular question focus (e.g., "Africa" and "Washington" may indicate multiple question foci).

Accordingly, as described herein, in certain embodiments a quality value may be assigned to the set of query attributes of the input question based on the number of query attributes that achieved their corresponding satisfaction thresholds in proportion to the total number of identified query attributes for the question (e.g., a percentage). For instance, the set of query attributes for the input question of "tmp in Africa and Washington" may be assigned a quality score of 25 (e.g., one query attribute of the four total query attributes achieved its corresponding satisfaction threshold; ¼). Other methods of calculating and assigning the quality values are also possible.

In certain embodiments, at block 408 the method may also include assigning weighting values to a subset of the query attributes. The set of weighting values may be quantitative indications of the relative importance of a particular query attribute with respect to the input question. For example, aspects of the present disclosure relate to the recognition that, in certain situations, a certain query attribute may be of particular importance or relevance to the input question (e.g., more so than other query attributes). As an example, consider the input question of "stolen painting found by museum." The syntax of the phrase allows for two potential interpretations; that the stolen painting was recovered by museum officials, or that the stolen painting was physically located nearby the museum. Accordingly, in such a sentence, the query attribute of "query syntax" may be assigned an increased weighting value, as the syntax of the sentence is particularly important for correct parsing.

Consistent with various embodiments, aspects of the present disclosure are directed toward collecting user context data for a user that submitted an input question to the question answering system. Generally, the user context data may include information regarding the age, level of education, native language, sentiment (e.g., emotional state), and input device (e.g., the device used to submit the input question to the question answering system.) In certain embodiments, the user context data may be collected from a user profile for the user. In certain embodiments, the user context data may be collected via a user interface configured to directly query the user. Additionally, in certain embodiments, the user context data may be collected using a linguistic profiling technique configured to analyze the semantic and syntactic content of the input question (e.g., the language used in the input question may provide information including the likely age, level of education, and native language of the user).

In certain embodiments, based on the collected user context data, the method 400 may include modifying the set of weighting values assigned to the set of query attributes. Modifying the set of weighting values may include increasing or decreasing the weighting value assigned to one or more query attributes of the set of query attributes. As an example, in certain embodiments, the method 400 may determine, based on the context data collected for a user, that English is not the native language of the user. Accordingly, based on this information, the method 400 may include decreasing the weighting value assigned to the query attribute of part-of-speech usage (e.g., a higher tolerance threshold for grammatical mistakes may be acceptable for non-native English speakers). In certain embodiments, the set of quality values assigned to the set of query attributes may be calculated based on the set of weighting values. For instance, a query attribute that has been assigned a greater weighting value may have a greater impact on the overall quality value for the set of query attributes than a query attribute that has a lesser weighting value. Similarly, query attributes that have been assigned reduced weighting values may have less impact on the overall quality value assigned to the set of query attributes. Other methods of modifying the weighting values and calculating the quality values are also possible.

Aspects of the present disclosure, in certain embodiments, are directed toward providing a visual representation of the quality of an input question received by a question answering system. The visual representation may indicate to a user that improving one or more query attributes of the input question may allow the question answering system to provide better (e.g., more complete) search results. Accordingly, at block 410, the method 400 may include generating an icon that indicates a visual representation of the quality of the input question. The icon may include an image, picture, sign, symbol, or other visual representation. In certain embodiments, the icon may be a digital face icon (e.g., diagram of a face) such as an emoji or an emoticon. The digital face icon may include a set of facial elements such as a nose, mouth, eyes, ears, hair, eyebrows, facial hair and other facial features. Each facial element of the set of facial elements may have a set of visual characteristics including color, shape, size, location, and animation style. Generally, a digital face icon with facial elements that convey a positive sentiment may indicate that the query attributes of the input question are satisfactory and not in need of revision, whereas a digital face icon with facial elements that convey a substantially negative sentiment may indicate that one or more query attributes are in need of revision.

In certain embodiments, the digital face icon may be generated based on the quality value(s) assigned to the set of query attributes. More particularly, the arrangement and visual characteristics of the facial elements that compose the digital face icon may be selected based on the quality values assigned to the set of query attributes. In certain embodiments, particular configurations of the facial elements may correspond to particular query attributes. For example, a first configuration of facial elements may correspond to a query attribute of query length, while a second configuration of facial elements may correspond to a query attribute of query syntax. More particularly, the visual characteristics of the facial elements may be adjusted based on the quality score assigned to a query attribute.

Figure 5:
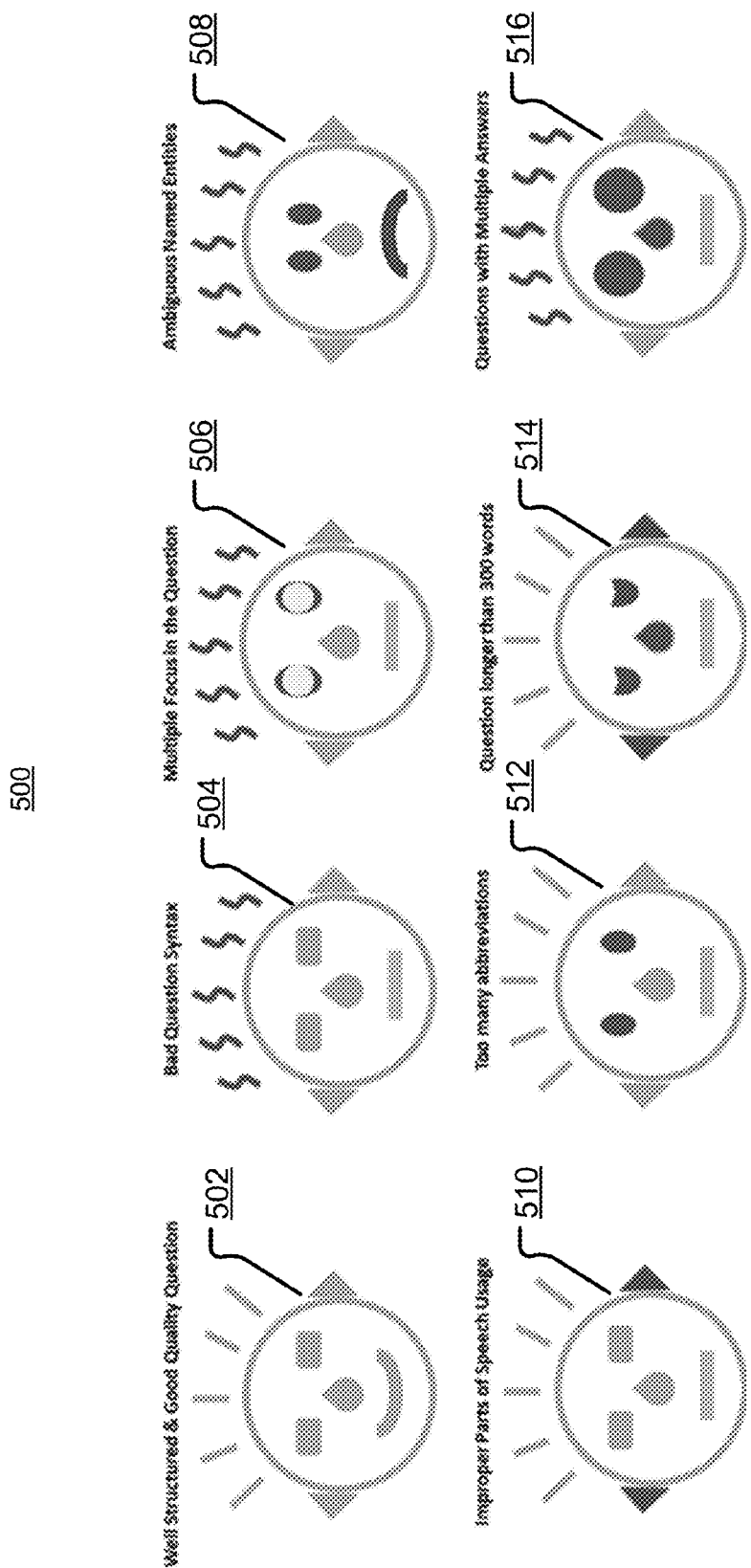
FIG. 5 is an illustration of example icons for visually illustrating question quality, consistent with embodiments of the present disclosure.

FIG. 5 is an illustration of example icons 500 for visually illustrating question quality, consistent with embodiments of the present disclosure. As described herein, each digital face icon shown in FIG. 5 corresponds to a query attribute of the set of query attributes. Accordingly, each digital face icon may indicate to a user which, if any, query attributes are in need of revision. Furthermore, the facial elements and visual characteristics for each facial element may be determined based on the quality scores assigned to the set of query attributes, and whether or not a given query attribute achieved a corresponding satisfaction threshold. Other facial elements and visual characteristics beyond those depicted in FIG. 5 are also possible.

Aspects of the present disclosure relate to the recognition that, in certain situations, an input question received by the question answering system may be well-structured, complete, and achieve substantially high quality values with regard to each of the query attributes. Accordingly, digital face icon 502 may be generated to indicate to the user that the input question was of high quality, and no revision is necessary. As described herein, in certain embodiments, an input question may have improper grammatical syntax, and fail to achieve a satisfaction threshold corresponding to the query attribute of query syntax. Accordingly, digital face icon 504 may be generated and provided to indicate to a user that revisions to the syntax of the input question may be necessary.

Consider the following example. In certain embodiments, the question answering system may receive an input question such as "Who is the oldest president and vice president of the United States?" In such an input question, the language of the question may lead to ambiguity as to whether the focus of the question is the "president" or the "vice president." The input question may fail to achieve a satisfaction threshold corresponding to the query attribute of query focus. Accordingly, digital face icon 506 may be generated and provided to the user to indicate that revisions to the focus of the question may lead to more complete search results. Similarly, in certain embodiments, an input question of "Zoos in Washington," may be received by the question answering system. The language of the question may lead to ambiguity regarding whether the user meant the state of Washington, Washington D.C., the city of Washington in North Carolina, or another location named Washington. Accordingly, the input question may fail to achieve a satisfaction threshold corresponding to the query attribute of ambiguous terminology, and the method 400 may generate the digital face icon 508 to provide to the user.

In certain embodiments, the question answering system may receive an input question from a user that contains improper part-of-speech usage. For example, consider the input question "What is the affect of vinegar on baking powder?" In such an input question, the noun "affect" has been incorrectly used in place of the verb "effect." Accordingly, in such a situation, the input question may fail to achieve a satisfaction threshold corresponding to the query attribute of part-of-speech usage, and the method 400 may generate the digital face icon 510 to provide to the user.

In certain embodiments, the question answering system may receive an input question from a user that contains a substantially large number of abbreviations. In such a situation, it may be difficult for the question answering system to determine the focus of the question. For example, consider the example input question "Educ. info for compl. CV; SME MD pos." In such an input question, the abbreviations may obfuscate the goal or focus of the input question (e.g., a user may be asking for "education information for complete curriculum vitae; small/medium enterprise management position"). Accordingly, the input question may fail to achieve a satisfaction threshold corresponding to abbreviation usage, and the method 400 may generate the digital face icon 512 to provide to the user.

In certain embodiments, the question answering system may receive an input question that exceeds a maximum word count (e.g., 300 words) specified by an assessment criterion, and fail to achieve a corresponding satisfaction threshold. Accordingly, the method 400 may generate the digital face icon 514 to provide to the user. Similarly, in certain embodiments, the question answering system may receive an input question that could potentially be answered with multiple questions. As an example, consider the input question, "Examples of rare bats?" The language of the question does not specify whether the user is looking for information regarding rare and collectible baseball bats, or instead regarding uncommon varieties of the winged mammal. Accordingly, the input question may fail to achieve a satisfaction threshold corresponding to multiple potential question answers, and the method 400 may generate the digital face icon 516 to provide to the user. Additionally, in certain embodiments, the digital face icon 516 may be generated in response to receiving an input question that could be answered with more than one lexical answer types. As an example, the question answering system may receive an input question such as "What is the date and place of birth of Abraham Lincoln?" As the language of the question prompts for answers of two lexical answer types (e.g., date and location), the method 400 may generate the digital face icon 516 to provide to the user.

Although aspects of FIG. 5 are directed toward an embodiment in which a digital face icon may correspond to a single query attribute, aspects of the present disclosure relate to the recognition that, in certain embodiments, an input question may have multiple query attributes that fail to achieve corresponding satisfaction thresholds. In view of this, aspects of the present disclosure, in certain embodiments, are directed toward generating a digital face icon that may simultaneously indicate the quality of multiple query attributes of an input question.

Accordingly, in certain embodiments, aspects of the present disclosure relate to mapping a first query attribute of the input question to a first facial element of a digital face icon. As an example, a query attribute of "query length" may be mapped to a first facial element such as "mouth". Similarly, a query attribute of "query syntax" may be mapped to a facial element such as "hair." Based on the quality value assigned to each query attribute, the method 400 may include selecting a set of visual characteristics for the first facial element. As described herein, the set of visual characteristics may include properties such as color, shape, size, location, and animation style. The set of visual characteristics may be selected for the facial element in such a way as to indicate to a user whether the corresponding query attribute achieved its satisfaction threshold. For instance, in a situation where the query attribute of "query length" failed to achieve a corresponding satisfaction threshold and is mapped to the facial element of "mouth," the set of visual characteristics may be selected such that the mouth is curved down, in a frown. In a situation where the query attribute of query length achieved a corresponding satisfaction threshold, the set of visual characteristics may be selected such that the mouth is curved upwards, in a smile.

Based on the set of quality values and the set of weighting values assigned to the set of query attributes, the method 400 may include assembling a digital face icon. In this way, each facial element of the digital face icon may be generated in such a way as to indicate the quality of the respective query attribute to which it corresponds. As an example, assembling the digital face icon may include grouping facial elements including a mouth, nose, eyes, ears, and hair. Each facial element may correspond to a query attribute of the input question. For instance, a query attribute of query length may correspond to the mouth, a query attribute of query syntax may correspond to the hair, a query attribute of part-of speech usage may correspond to the nose, a query attribute of abbreviation may correspond to the ears, and a query attribute of query complexity may correspond to the eyes.

In certain embodiments, a user may use a mouse, touch screen, keyboard, or other user interface device to designate a particular facial element of the digital face icon. Accordingly, aspects of the present disclosure are directed toward providing a brief description or summary of the facial element and corresponding query attribute in response to receiving such an indication from a user. For instance, in certain embodiments, in response to a user highlighting the mouth of the digital face icon with a mouse pointer, a text box may appear that explains that the mouth of the digital face icon corresponds to the length of the input question, and whether or not the length of the input question is in need of user revision.

As described herein, assembling the digital face icon may be based on the quality values and the weighting values for each query attribute. For instance, a facial element corresponding to a query attribute that has a higher weighting value relative to other query attributes may be larger than the other facial elements. Similarly, facial elements corresponding to query attributes that have quality values higher than a corresponding satisfaction threshold may be represented with visual characteristics that indicate a positive sentiment (e.g., smiling mouths, upturned eyes) while facial elements corresponding to query attributes that have quality values lower than corresponding satisfaction thresholds may be represented with visual characteristics that indicate a negative sentiment (e.g., frowning faces, downturned eyes). Other methods of assembling the digital face icon are also possible.

Aspects of the present disclosure, in certain embodiments, are directed toward modifying the digital face icon using feedback collected from users. Modifying the digital face icon may include adjusting the set of visual characteristics of one or more facial elements of the digital face icon. In certain embodiments, the method 400 may include using a graphical user interface to collect user feedback data regarding the digital face icon. The user feedback data may include an appraisal of the digital face icon. For instance, the user feedback data may include ratings, scores, or other information that indicates an assessment of the digital face icon. The method 400 may include using a machine learning technique configured to process the user feedback data, and define a decision parameter for generating the digital face icon. The decision parameter may be a rule, principle, or other guideline that can be used to facilitate the generation of digital face icons that are helpful to users. In certain embodiments, the decision parameter may be a revision for one or more assessment criteria. For instance, as an example, the decision parameter may be a rule revising the maximum recommended query length from 20 words to 25 words. Based on the revised assessment criteria, the method 400 may also include adjusting the set of visual characteristics of the digital face icon. For instance, adjusting the set of visual characteristics based on the decision parameter may include changing the mouth facial element from a frown to a smile (e.g., the input question may have been 24 words long, and was previously determined to have failed to achieve the satisfaction threshold, but now achieves the satisfaction threshold due to the revision). Other methods of adjusting the set of visual characteristics are also possible.

Figure 6:
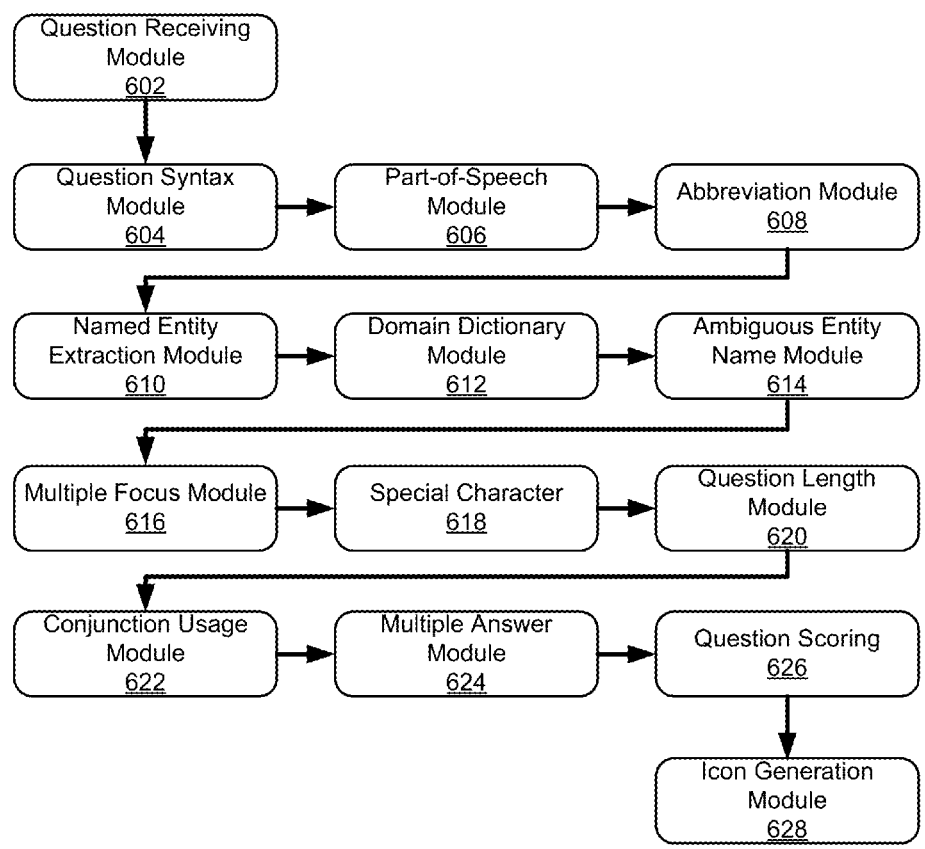
FIG. 6 is a flowchart illustrating an operation for generating an icon to visually represent question quality, consistent with embodiments of the present disclosure.

FIG. 6 is a flowchart illustrating an operation 600 for generating an icon to visually represent question quality, consistent with embodiments of the present disclosure. Aspects of FIG. 6 are directed toward using a system of modules to perform an analysis of an input question received by a question answering system, and generating an icon to represent the quality of the input question. In addition to the modules referenced explicitly herein, other modules and methods of generating the icon are also possible. Additionally, the steps performed by the system of modules may be performed in an order other than that depicted in FIG. 6.

As described herein, in certain embodiments, the question receiving module 602 may be configured to receive an input question from a user. Question receiving module 602 may substantially correspond to block 404 of FIG. 4. The input question may be one or more words that form a search term or request for data, information or knowledge. The input question may be a sentence or phrase expressed in natural language.

As described herein, in certain embodiments, in response to receiving the input question, the input question may be parsed and analyzed by a system of modules configured to process a set of query attributes of the input question and evaluate the input question on the basis of a set of assessment criteria. Accordingly, question syntax module 604 may be configured to parse the syntax of the input question (e.g., the structure of the language), the part-of-speech module 606 may process the part-of-speech usage of each term in the query, and the abbreviation module 608 may be configured to identify the abbreviations used in the input question. The named entity extraction module 610 may be configured to identify the names of proper entities (e.g., people, places, other proper nouns), the domain dictionary module 612 may be configured to compare uncommon terms with a database or dictionary to determine the likely intended meaning, and the ambiguous entity name module 614 may be configured to identify ambiguously named entities present in the input question (e.g., the state of Washington or the city of Washington).

The multiple focus module 616 may be configured to identify the central query in case that multiple conflicting elements are present, the special character module 618 may be configured to identify the contextual meaning of symbols, letters, figures, or other characters used in the input question (e.g., @, #) and the question length module 620 may be configured to determine the number of words present in the input question. The conjunction usage module 622 may be configured to identify the instances of conjunction in the language of the input question, the multiple answer module 624 may be configured to identify situations in which multiple answers may be appropriate for the input question and the desired answer is unclear from the language of the question. The question scoring module 626 may be configured to compare the output of each module of the system to a set of assessment criteria for each query attribute of the input question, and assign a quality score to the input question. Based on the quality score of the input question, the icon generation module 628 may be configured to generate the digital face icon.

Figure 7:
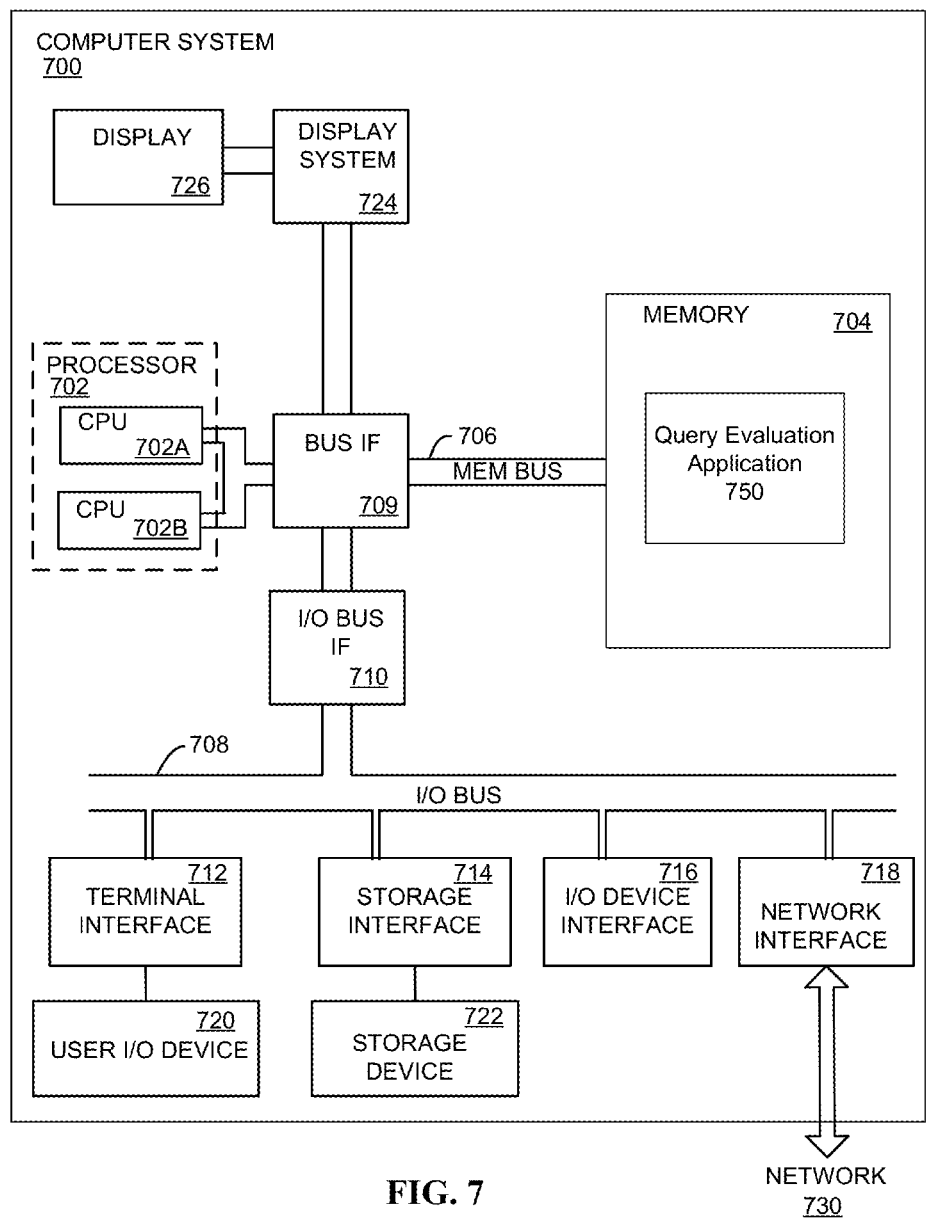
FIG. 7 depicts a high-level block diagram of a computer system for implementing various embodiments of the present disclosure.

FIG. 7 depicts a high-level block diagram of a computer system 700 for implementing various embodiments. The mechanisms and apparatus of the various embodiments disclosed herein apply equally to any appropriate computing system. The major components of the computer system 700 include one or more processors 702, a memory 704, a terminal interface 712, a storage interface 714, an I/O (Input/Output) device interface 716, and a network interface 718, all of which are communicatively coupled, directly or indirectly, for inter-component communication via a memory bus 706, an I/O bus 708, bus interface unit 709, and an I/O bus interface unit 710.

The computer system 700 may contain one or more general-purpose programmable central processing units (CPUs) 702A and 702B, herein generically referred to as the processor 702. In embodiments, the computer system 700 may contain multiple processors; however, in certain embodiments, the computer system 700 may alternatively be a single CPU system. Each processor 702 executes instructions stored in the memory 704 and may include one or more levels of on-board cache.

In embodiments, the memory 704 may include a random-access semiconductor memory, storage device, or storage medium (either volatile or non-volatile) for storing or encoding data and programs. In certain embodiments, the memory 704 represents the entire virtual memory of the computer system 700, and may also include the virtual memory of other computer systems coupled to the computer system 700 or connected via a network. The memory 704 can be conceptually viewed as a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 704 may store all or a portion of the various programs, modules and data structures for processing data transfers as discussed herein. For instance, the memory 704 can store a query evaluation application 750. In embodiments, the query evaluation application 750 may include instructions or statements that execute on the processor 702 or instructions or statements that are interpreted by instructions or statements that execute on the processor 702 to carry out the functions as further described below. In certain embodiments, the query evaluation application 750 is implemented in hardware via semiconductor devices, chips, logical gates, circuits, circuit cards, and/or other physical hardware devices in lieu of, or in addition to, a processor-based system. In embodiments, the query evaluation application 750 may include data in addition to instructions or statements.

The computer system 700 may include a bus interface unit 709 to handle communications among the processor 702, the memory 704, a display system 724, and the I/O bus interface unit 710. The I/O bus interface unit 710 may be coupled with the I/O bus 708 for transferring data to and from the various I/O units. The I/O bus interface unit 710 communicates with multiple I/O interface units 712, 714, 716, and 718, which are also known as I/O processors (IOPs) or I/O adapters (IOAs), through the I/O bus 708. The display system 724 may include a display controller, a display memory, or both. The display controller may provide video, audio, or both types of data to a display device 726. The display memory may be a dedicated memory for buffering video data. The display system 724 may be coupled with a display device 726, such as a standalone display screen, computer monitor, television, or a tablet or handheld device display. In one embodiment, the display device 726 may include one or more speakers for rendering audio. Alternatively, one or more speakers for rendering audio may be coupled with an I/O interface unit. In alternate embodiments, one or more of the functions provided by the display system 724 may be on board an integrated circuit that also includes the processor 702. In addition, one or more of the functions provided by the bus interface unit 709 may be on board an integrated circuit that also includes the processor 702.

The I/O interface units support communication with a variety of storage and I/O devices. For example, the terminal interface unit 712 supports the attachment of one or more user I/O devices 720, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 720 and the computer system 700, and may receive output data via the user output devices. For example, a user interface may be presented via the user I/O device 720, such as displayed on a display device, played via a speaker, or printed via a printer.

The storage interface 714 supports the attachment of one or more disk drives or direct access storage devices 722 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 722 may be implemented via any type of secondary storage device. The contents of the memory 704, or any portion thereof, may be stored to and retrieved from the storage device 722 as needed. The I/O device interface 716 provides an interface to any of various other I/O devices or devices of other types, such as printers or fax machines. The network interface 718 provides one or more communication paths from the computer system 700 to other digital devices and computer systems; these communication paths may include, e.g., one or more networks 730.

Although the computer system 700 shown in FIG. 7 illustrates a particular bus structure providing a direct communication path among the processors 702, the memory 704, the bus interface 709, the display system 724, and the I/O bus interface unit 710, in alternative embodiments the computer system 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 708 are shown as single respective units, the computer system 700 may, in fact, contain multiple I/O bus interface units 710 and/or multiple I/O buses 708. While multiple I/O interface units are shown, which separate the I/O bus 708 from various communications paths running to the various I/O devices, in other embodiments, some or all of the I/O devices are connected directly to one or more system I/O buses.

In various embodiments, the computer system 700 is a multi-user mainframe computer system, a single-user system, or a server computer or similar device that has little or no direct user interface, but receives requests from other computer systems (clients). In other embodiments, the computer system 700 may be implemented as a desktop computer, portable computer, laptop or notebook computer, tablet computer, pocket computer, telephone, smart phone, or any other suitable type of electronic device.

FIG. 7 depicts several major components of the computer system 700. Individual components, however, may have greater complexity than represented in FIG. 7, components other than or in addition to those shown in FIG. 7 may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method in a deep question answering system for providing a visual representation of question quality, the method comprising:
   receiving, by a question answering system, an input question having a set of query attributes, wherein the set of query attributes are user-influenced characteristics of the input question;
   evaluating, by comparing the set of query attributes to a set of assessment criteria, the quality of the input question, wherein evaluating includes:
      parsing, using a natural language processing technique configured to analyze semantic and syntactic content, the input question,
      identifying, based on the semantic and syntactic content, the set of query attributes of the input question, and
      determining whether each query attribute of the set of query attributes achieves a corresponding satisfaction threshold of a set of satisfaction thresholds with respect to the set of assessment criterion;
   assigning, in response to evaluating the quality of the input question, a respective quality value of a set of quality values to each query attribute of the set of query attributes, wherein each respective quality value is a value that indicates whether the respective query attribute satisfies the corresponding satisfaction threshold; and
   generating, using the assigned set of quality values and the set of query attributes, an icon that indicates a visual representation of the quality of the input question; wherein generating the icon comprises:
      mapping each query attribute of the set of query attributes to a respective element of the icon; and
      selecting a corresponding set of visual characteristics for each respective element of the icon based on the respective quality value assigned to the query attributed mapped to the respective element of the icon to visually indicate whether the query attribute mapped to the respective element of the icon satisfies the corresponding satisfaction threshold;
   the method further comprising:
   assigning, to a subset of the set of query attributes, a set of weighting values, wherein the set of weighting values indicates a quantitative representation of the relative importance of a particular query attribute of the set of query attributes with respect to the input question;
   collecting, by analyzing the input question using a linguistic profiling technique, multi-factorial user context data including age data, level of education data, native language data, sentiment data, and input device data;
   modifying, based on the multi-factorial user context data, the set of weighting values assigned to the set of query attributes; and
   calculating, based on the set of weighting values assigned to the set of query attributes, the set of quality values.

2. The method of claim 1, wherein the set of query attributes include query syntax, part-of-speech usage, query length, and query complexity.

3. The method of claim 1, wherein the set of query attributes further include abbreviation usage, ambiguous terminology, missing elements, and question focus.

4. The method of claim 1, wherein generating the icon includes:
mapping, to a first facial element of a digital face icon, a first query attribute of the set of query attributes;
selecting, based on a first quality value assigned to the first query attribute, a set of visual characteristics for the first facial element.

5. The method of claim 4, wherein the set of visual characteristics for the first facial element include color, shape, size, location, and animation style.

6. The method of claim 4, further comprising:
assembling, based on the set of quality values, the set of weighting values, and the set of query attributes, a digital face icon that indicates a visual representation of the quality of the input question.

7. The method of claim 6, further comprising:
collecting, using a graphical user interface, user feedback data regarding the digital face icon;
defining, using a machine learning technique configured to process the user feedback data, a decision parameter for generating the digital face icon; and
adjusting, based on the feedback data and the decision parameter, the set of visual characteristics of the digital face icon.

8. A computer system comprising:
at least one processor;
a memory coupled to the at least one processor;
a visual representation generation mechanism executed by one or more of the at least one processor, the visual representation generation mechanism including:
a receiving module to receive, using a question answering system, an input question having a set of query attributes, wherein the set of query attributes are user-influenced characteristics of the input question;
an evaluating module to evaluate, by comparing the set of query attributes to a set of assessment criteria, the quality of the input question, wherein evaluating includes:
a parsing module to parse, using a natural language processing technique configured to analyze semantic and syntactic content, the input question,
an identifying module to identify, based on the semantic and syntactic content, the set of query attributes of the input question, and
a determining module to determine whether each query attribute of the set of query attributes achieves a corresponding satisfaction threshold of a set of satisfaction thresholds with respect to the set of assessment criterion;
an assigning module to assign, in response to evaluating the quality of the input question, a respective quality value of a set of quality values to each query attribute of the set of query attributes, wherein each respective quality value is a value that indicates whether the respective query attribute satisfies the corresponding satisfaction threshold; and
a generating module to generate, using the assigned set of quality values and the set of query attributes, an icon that indicates a visual representation of the quality of the input question, wherein the generating module is configured to generate the icon by:
mapping each query attribute of the set of query attributes to a respective element of the icon; and
selecting a corresponding set of visual characteristics for each respective element of the icon based on the respective quality value assigned to the query attributed mapped to the respective element of the icon to visually indicate whether the query attribute mapped to the respective element of the icon satisfies the corresponding satisfaction threshold;
wherein the processor is configured to:
assign, to a subset of the set of query attributes, a set of weighting values, wherein the set of weighting values indicates a quantitative representation of the relative importance of a particular query attribute of the set of query attributes with respect to the input question;
collect, by analyzing the input question using a linguistic profiling technique, multi-factorial user context data including age data, level of education data, native language data, sentiment data, and input device data;
modify, based on the multi-factorial user context data, the set of weighting values assigned to the set of query attributes; and
calculate, based on the set of weighting values assigned to the set of query attributes, the set of quality values.

9. The system of claim 8, wherein the set of query attributes include query syntax, part-of-speech usage, query length, and query complexity.

10. The system of claim 8, wherein the set of query attributes further include abbreviation usage, ambiguous terminology, missing elements, and question focus.

11. A computer program product comprising a non-transitory computer readable storage medium having a computer readable program stored therein, wherein the computer readable program, when executed on a first computing device, causes the computing device to:
receive, by a question answering system, an input question having a set of query attributes, wherein the set of query attributes are user-influenced characteristics of the input question;
evaluate, by comparing the set of query attributes to a set of assessment criteria, the quality of the input question, wherein being caused to evaluate includes being caused to:
parse, using a natural language processing technique configured to analyze semantic and syntactic content, the input question,
identify, based on the semantic and syntactic content, the set of query attributes of the input question, and
determine whether each query attribute of the set of query attributes achieves a corresponding satisfaction threshold of a set of satisfaction thresholds with respect to the set of assessment criterion;
assign, in response to evaluating the quality of the input question, a respective quality value of a set of quality values to each query attribute of the set of query attributes, wherein each respective quality value is a value that indicates whether the respective query attribute satisfies the corresponding satisfaction threshold; and
generate, using the assigned set of quality values and the set of query attributes, an icon that indicates a visual representation of the quality of the input question, wherein, to generate the icon, the computer readable program causes the computing device to:
map each query attribute of the set of query attributes to a respective element of the icon; and select a corresponding set of visual characteristics for each respective element of the icon based on the respective quality value assigned to the query attributed mapped to the respective element of the icon to visually indicate whether the query attribute mapped to the respective element of the icon satisfies the corresponding satisfaction threshold;

wherein the computer readable program further causes the computing device to:

assign, to a subset of the set of query attributes, a set of weighting values, wherein the set of weighting values indicates a quantitative representation of the relative importance of a particular query attribute of the set of query attributes with respect to the input question;

collect, by analyzing the input question using a linguistic profiling technique, multi-factorial user context data including age data, level of education data, native language data, sentiment data, and input device data;

modify, based on the multi-factorial user context data, the set of weighting values assigned to the set of query attributes; and calculate, based on the set of weighting values assigned to the set of query attributes, the set of quality values.

12. The computer program product of claim 11, wherein the set of query attributes include query syntax, part-of-speech usage, query length, query complexity, abbreviation usage, ambiguous terminology, missing elements, and question focus.

13. The computer program product of claim 11, wherein the computer readable program further causes the computing device to:

map, to a first facial element of a digital face icon, a first query attribute of the set of query attributes;

select, based on a first quality value assigned to the first query attribute, a set of visual characteristics for the first facial element.

14. The computer program product of claim 13, wherein the set of visual characteristics for the first facial element include color, shape, size, location, and animation style.

15. The computer program product of claim 13, wherein the computer readable program further causes the computing device to:

assemble, based on the set of quality values, the set of weighting values, and the set of query attributes, a digital face icon that indicates a visual representation of the quality of the input question.

16. The computer program product of claim 15, wherein the computer readable program further causes the computing device to:

collect, using a graphical user interface, user feedback data regarding the digital face icon;

define, using a machine learning technique configured to process the user feedback data, a decision parameter for generating the digital face icon; and adjust, based on the feedback data and the decision parameter, the set of visual characteristics of the digital face icon.

* * * * *